United States Patent [19]

Rothwell

[11] 4,224,805
[45] Sep. 30, 1980

[54] SUBTERRANEAN HEAT EXCHANGER FOR REFRIGERATION AIR CONDITIONING EQUIPMENT

[76] Inventor: H. Richard Rothwell, 6155 Real St., Groves, Tex. 77619

[21] Appl. No.: 949,676

[22] Filed: Oct. 10, 1978

[51] Int. Cl.³ ............... F25D 23/12; F25B 27/02; F25B 13/00
[52] U.S. Cl. ............................ 62/260; 62/238; 62/324; 165/45
[58] Field of Search ............... 62/260, 324 D, 238 E, 62/119, 310, DIG. 2, 118, 504, 509, 64, 174; 165/45

[56] References Cited

U.S. PATENT DOCUMENTS

| | | | |
|---|---|---|---|
| 1,875,305 | 8/1932 | Hill | 165/45 |
| 2,156,096 | 4/1939 | Robinson | 62/DIG. 2 |
| 2,438,720 | 3/1948 | Smith | 62/260 |
| 2,490,983 | 12/1949 | Smith et al. | 62/324 D |
| 2,503,456 | 4/1950 | Smith | 62/324 D |
| 2,554,661 | 5/1951 | Clancy | 165/45 |
| 3,848,427 | 11/1974 | Loofbourow | 62/260 |
| 3,965,694 | 6/1976 | Vignal et al. | 62/260 |
| 4,094,356 | 6/1978 | Ash et al. | 165/45 |

Primary Examiner—Lloyd L. King
Attorney, Agent, or Firm—Gunn, Lee & Jackson

[57] ABSTRACT

Heat exchanger apparatus for use with refrigeration cycle heating and cooling equipment is disclosed. In the preferred embodiment, it cooperates with and modifies refrigeration equipment including a compressor, an expansion valve, an evaporator coil and a closed loop for cycling refrigerant. This apparatus is a sealed container adapted to be placed in a well extending into artesian (relatively heated or chilled) formations whereby the water of the formation stabilizes the temperature around the unit and enables heating and cooling. The sealed unit receives refrigerant from the top which flows along the sidewall at a reduced temperature, thereby condensing on the sidewall and trickling down the sidewall to collect in a sump at the bottom where the compressor pump picks up condensed refrigerant as a liquid and pumps it out of the artesian well to the connected refrigeration equipment.

7 Claims, 3 Drawing Figures

SUBTERRANEAN HEAT EXCHANGER FOR REFRIGERATION AIR CONDITIONING EQUIPMENT

BACKGROUND OF THE DISCLOSURE

In the cooling of houses and commercial buildings, refrigeration equipment operating on a well known cycle is customarily used. The cycle of operation is fairly well spelled out by describing the equipment associated with the apparatus. Refrigerant flows in a closed, endless loop. The flow is initiated by a compressor which is a large pump. The compressor pumps the refrigerant which flows through a cooling coil to surrender heat and, thereby, drop the temperature. At this point, the refrigerant becomes a cooled liquid. The refrigerant flows through an expansion valve. Upon expansion to a gas, it tends to cool. It flows, while cooling, through another heat exchanger which is often called an evaporator. External to the system, a fan driven by a motor blows air over the evaporator coil to thereby cool the air. The endless loop continues from the evaporator coil to the compressor pump.

The present invention is apparatus adapted to be substituted in the refrigeration equipment described in very broad terms above. While the remaining components of the refrigeration equipment remain unaltered and are well known, this invention is a modification whereby power reductions in operation can be achieved. This invention yields savings in size or scale and may, in some instances, reduce cost of operation.

A large portion of the power required for refrigeration equipment is required by the compressor motor. By and large, it is an electric motor driving a gas compressor or pump which picks up high temperature, low density refrigerant gas. The gas is compressed to a high pressure and temperature. Thereafter, it passes through a heat exchanger or condenser. By giving up heat at the condenser, the temperature of the highly compressed vapors is dropped sufficient to bring about a change in phase to a liquid. The liquid is then transferred through the endless cycle. The compressor must work with vapors, not incompressible liquid, and it is in this area that substantial amounts of power are used, and, yet, the power is converted only into heat by attempting to raise the pressure of the highly compressible gas.

The present invention contemplates a reduction in electric power consumption by modifying the cycle through the use of a combined condenser, support structure and a liquid refrigerant pump. A tremendous gain can often be achieved by placing the liquid pump downhole so that it is submerged in a sump and surrounded by liquid refrigerant. This provides it with an in-flow of liquid refrigerant, and it, therefore, does not operate inefficiently by compressing a highly compressible gas. Rather, the pump must impart pressure to an in-flow of incompressible liquid. A surface-located compressor (seen in one embodiment) works at greatly reduced discharge pressure as a result of efficiency gained on subterranean heat transfer.

The present invention is particularly able to save power in operation in comparison with known cooling towers. As an example, a cooling tower using air as a medium is dependent on the temperature of the surrounding air. At the time when the maximum load is imposed on an air cooled system, the temperature differential between the cooling medium (the surrounding air) and the refrigerant is minimal. The same is practically true for a cooling tower using water. Many cooling towers utilize water. The water assumes a temperature which is, in large part, dependent on the air temperature. While the air temperature may fluctuate hourly, the water in the cooling tower system will settle on a norm which is somewhat dependent on the long time average of the surrounding air temperature. Thus, the compressor discharge pressure is relatively high and, therefore, requires increased pressure.

Through the use of the present invention, downhole artesian formations are utilized as a heat sink. They normally operate at a fairly well established temperature. It is normally rather stable. This permits the design of the system with maximum temperature differential between the temperature of the refrigerant (on the heated side of the evaporator) and the cooling medium, the artesian water. More importantly, water temperatures in this arrangement typically run around 10° to 15° C. For instance, in an artesian well of about one hundred meters in depth, several artesian formations may be penetrated. Each artesian formation will have a normal operating temperature that is almost invariant, perhaps varying no more than one or two degrees Centigrade between winter and summer. This, of course, depends on a multitude of local factors, including the rate of introduction of water to the formation, rate of withdrawal, proximity to the surface and so on. As will be appreciated, the present invention is, thus, a marked improvement over devices known heretofore. In particular, it is an improvement by providing reduced power consumption, or, restated, more cooling power for a given rate of power consumption. This invention also reduces surface equipment installations. Cooling towers are constructed on the surface behind or on top of buildings. Through the advent of this invention, they can be located substantially out of sight, literally having no more than a visible wellhead. They enable joint use of an artesian well, namely, for the purpose of pumping water for water consumption and also utilization of the well as a cooling tower.

DETAILED DESCRIPTION OF THE PREFERRED EMBODIMENT

Figure 1:
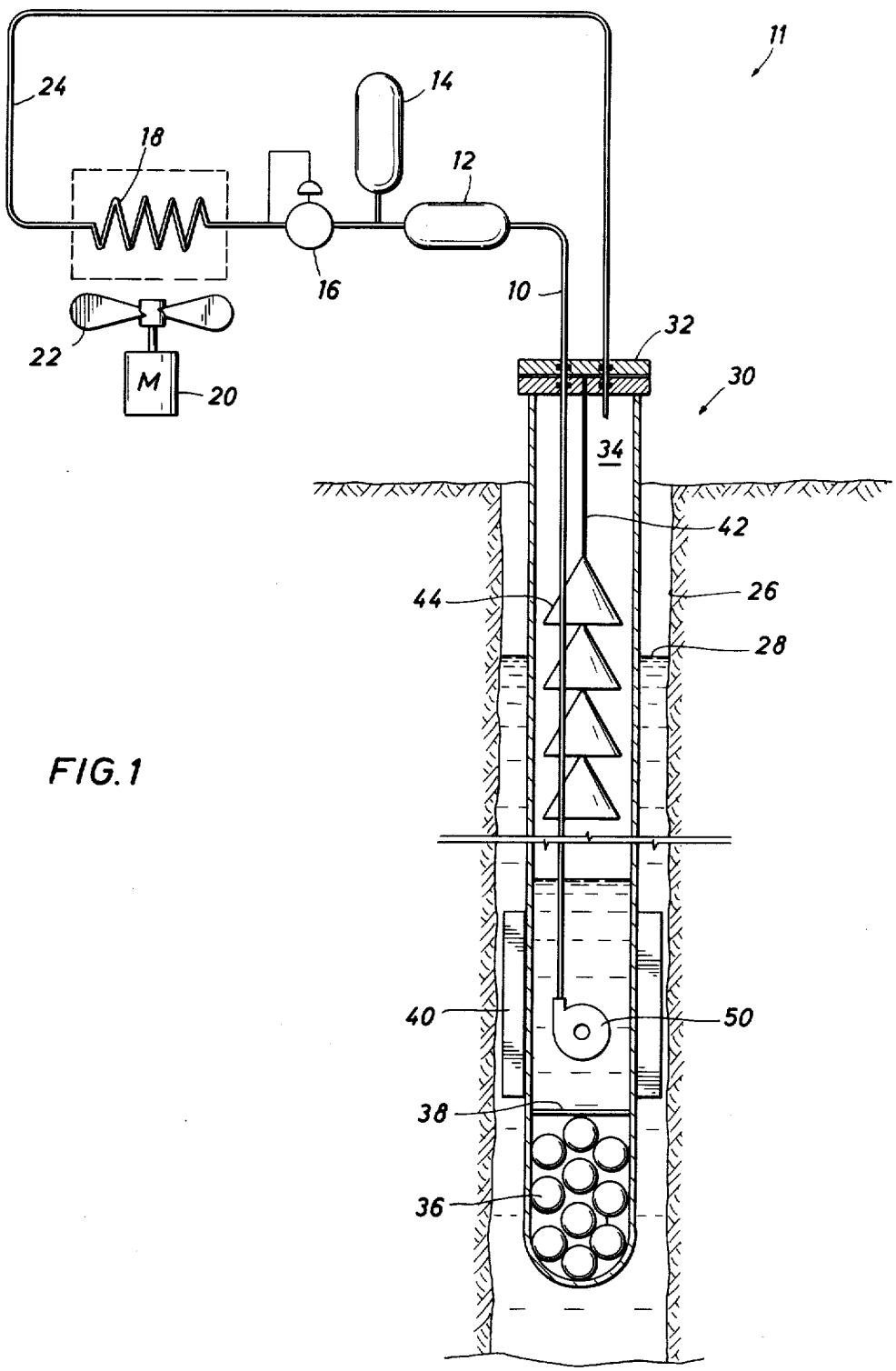
FIG. 1 is a system schematic of a refrigeration cycle which has been enhanced by the incorporation of the present invention which is shown installed in an artesian well.

Attention is first directed to FIG. 1 of the drawings. The numeral 11 identifies a complete set of refrigeration equipment. By complete set, reference is made to apparatus which provides a complete and unending cycle of operation using a selected refrigerant which is circulated endlessly along a fixed path through the equipment. Beginning with a conduit 10, condensed and cooled liquid refrigerant is delivered to a filter dryer 12 serially connected in the line 10. Since this is a pressurized system, it is helpful to incorporate a pressure surge accumulator 14 to smooth the pressure. As pressure is smoothed, the flow continues through the conduit to an expansion valve 16. The expansion valve 16 is provided with pressurized liquid refrigerant at the input, and it delivers a pressure regulated flow of liquid refrigerant for downstream expansion. The refrigerant flashes into a vapor on release of pressure, and the vapor passes into an evaporator coil 18. The evaporator coil 18 is formed of larger pipes or conduits so that the liquid may expand. On expansion, it absorbs heat. As the heat is absorbed, cooling occurs on the exterior of the evaporator coil 18.

The numeral 20 identifies a suitable motor which rotates a fan 22 for moving air over the coil 18. The evaporator coil 18 is received in some kind of housing including air-moving ducts, air filters, drip pans and the like, all paraphernalia normally associated with an air-moving system. Since this is on the exterior of the refrigeration cycle, its existence is noted for the purpose of pointing out how the present equipment cools air for a residence or commercial building.

The numeral 24 identifies a conduit which delivers heated, gaseous refrigerant. The conduit 24 is larger than the conduit 10 because it must carry gaseous refrigerant. Ordinarily, the conduits 10 and 24 are connected to a condenser coil. The condenser coil would be located in a cooling tower or some other kind of equipment for transfering heat out of the refrigerant. At this juncture, the modifications taught by the present invention will be considered wherein the conduits 10 and 24 connect with the present invention.

The numeral 26 identifies an artesian well which has subsurface water rising to the level indicated at 28. The well 26 may be any convenient depth, including one hundred meters in depth, or a depth sufficient to penetrate an artesian formation whereby water accumulates to the level 28. The precise depth is not critical. The precise temperature of the water is not critical, either. Ideally, the water is as cool as can be obtained in a given locale, and this, typically, will run in the range of about 10° to 15° C. Precautions (such as zone isolation) are taken so that the artesian water does not flow into porous sands and is otherwise lost or comingled. Ideally, the formation which produces the water is isolated from other waterbearing formations so that the water maintains a stable, low temperature. If the water is to be used at the surface for any purpose, suitable pumps and pipes are incorporated, but these have been omitted from the drawings for the sake of clarity.

The present invention utilizes a closed container or housing generally indicated at 30. It has a sealed top plate or cover 32. The plate or cover 32 is sealed to define an internal chamber 34. The chamber 34 is open whereby the conduit 24 opens into it. This introduces gaseous refrigerant into the chamber 34. It will be observed that the sealed housing means 30 is fairly long. Its length and diameter are scale factors dependent on the amount of refrigerant to be circulated through the device for a given interval of time. Representative measurements are an internal diameter of a few centimeters and a length of up to about 10.0 meters. The scale factors can be adjusted to accommodate a desired throughput.

The numeral 36 identifies heavy weights at the bottom of the chamber 30. These weights are for the purpose of sinking the substantially hollow, elongate cooling chamber in water. It is not important if they contact the refrigerant or not, but, for separation, a partition 38 separates the weights 36 and further defines a bottom-located sump. The term "sump" is applied to the lower portions of the chamber where liquid refrigerant may accumulate. The outer shell of the elongate, tubular chamber 30 includes guide fins 40. These protrude radially outwardly to align and position the chamber in the well. Just as importantly, they function as cooling fins, thereby enhancing heat transfer from the interior to the exterior of the chamber 30. In the present invention, heat is transferred from the interior to the exterior or into the artesian water. Simple contact of the cylindrical body with water may be sufficient; even further, the incorporation of cooling fins, as mentioned above, will boost heat transfer. The surface area of the cooling fins, again, is a scale factor which can be modified. Because the flow adjacent to the housing 30 is preferably unrestricted, vertical cooling fins which permit vertical flow are most desirable. At selected locations, an insulative jacket on the housing will prevent heat transfer at the wrong elevation in the well and permit transfer at the selected elevation.

On the interior of the housing 30, a vertical and central support 42 supports cone-shaped deflectors 44. These deflectors force the vaprous refrigerant toward the exterior or toward contact with the housing 30. In addition, they increase the cooling surface to increase the rate of condensation. In other words, the housing 30 has a cooled inner skin which contacts vapors in the housing for cooling purposes. As the vapors flow past the cooled exterior and cooled metal deflectors, the rate of condensation is enhanced. Several such deflector baffles 44 are shown. Other forms of enhanced heat exchanger members can be used. Generally speaking, the flow of vapor is from the top toward the bottom. As hot gas is introduced at the very top end, it surrenders heat at the cooler surfaces in the housing 30 and becomes heavier, settling toward the bottom. As it settles, it is deflected toward the wall to cool as it moves downwardly, and droplets accumulate on the inner wall and run down the wall. These droplets eventually accumulate and form a pool of liquid refrigerant at the very bottom of the housing 30. The precise depth of this pool is not particularly important, but it is sufficient to fill the sump to a predetermined level. The sump portion is, thus, the bottom-most liquid accumulating portion of the housing 30.

Substantially submerged in the sump portion and beneath the level of liquid determined by accumulating refrigerant, the present invention incorporates a refrigerant pump 50. The pump 50 is connected to the line 10. The pump 50 has an electric motor in the preferred embodiment which is powered by suitable electrical power delivered through wiring not shown in the drawings. The pump 50 has an inlet adapted to receive liquid refrigerant from the sump. This positioning enables the pump 50 to force liquid up through the conduit 10. It is then lifting a column of liquid. In other words, the pump is best working solely against a liquid head, not a compressible head of gas. More importantly, all input to the pump 50 is liquid. The pump, thus, does not have to force any of the refrigerant down; the pump is located at the very bottom of the housing 30. This bottom location accomplishes several things; it exposes the pump 50 only to liquid refrigerant. Additionally, the bottom location does not require the pump to first pump down and then up. Downward flow through the system is by gravity. The gravity feed is accomplished at reduced internal velocity in the system. Moreover, the downward gravity flow of the gases permits them to take whatever time is required to achieve cooling. In contrast with competitive equipment, the compressor is not required to pump unduly hot refrigerant. It operates at a fairly stable temperature which is, in large part, determined by the temperature of the water 28 in the immediate vicinity in the artesian formation.

A cycle of operation should be considered. With the equipment first switched "on," there is a beginning accumulation of liquid refrigerant in the sump. The pump 50, when first switched "on," forces liquid refrigerant upwardly through the conduit 10 and through the expansion valve 16. On expansion, the refrigerant cools the coil 18 and enables heat transfer. The refrigerant expands and forms a hot gas flowing in the line 24. The gas in the line 24 is delivered into the upper end of the housing 30. The gas flow is diverted toward the surrounding sidewall of the housing 30 and forms droplets of condensation on the wall. These droplets run down to the sump and are accumulated. During regular operation, the cycle is continued indefinitely, thereby removing heat from air circulated by the motor 20 and eventually transfering it to the artesian water 28. As long as suitable scale factors are observed, the artesian water will percolate into and out of the artesian formation which furnishes the water and will maintain a fairly stable temperature. Moreover, the cycle of operation repeats indefinitely.

It is particularly important to note that the pump 50 is called on to lift liquid refrigerant which is precooled and substantially incompressible. Moreover, the pump is at the very bottommost part of the refrigerant flow cycle.

Figure 2:
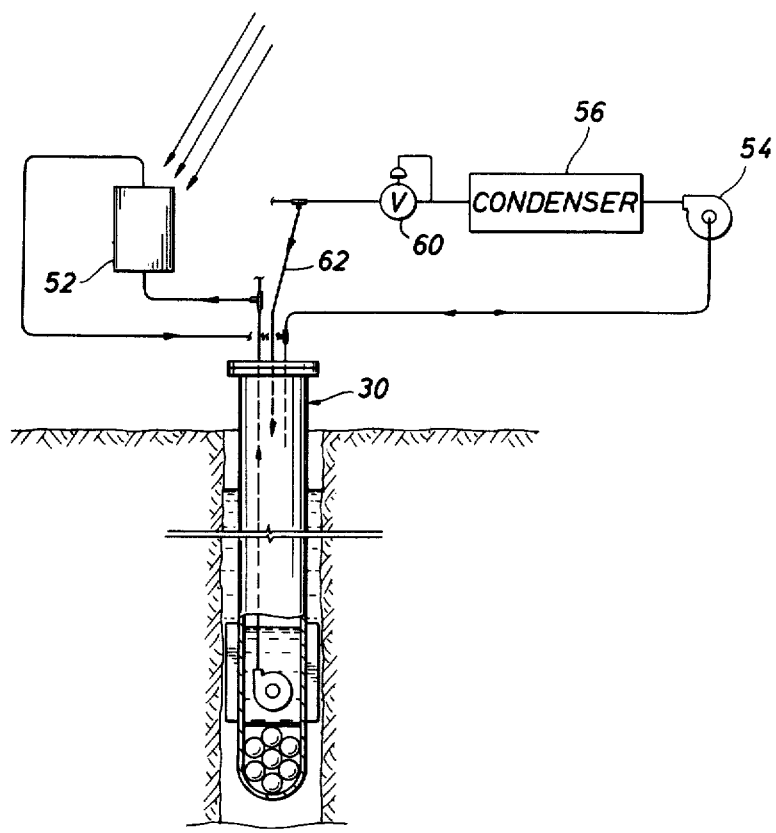
FIG. 2 is an alternate embodiment of the apparatus arranged for use with a solar system to provide heating.

Attention is next directed to FIG. 2 of the drawings. FIG. 2 shows the downhole housing 30, and it will be observed to be constructed in the same manner as that shown in FIG. 1. The topside equipment is different. There is an evaporator 52 which is additionally a solar heat evaporator. It is furnished with cool, liquid refrigerant, and the refrigerant is heated or evaporated. This, in turn, flows to a compressor 54 as a hot gas. The compressor 54 is communicated with a condenser 56. The condenser 56 is serially connected with a pressure control valve 60. A return path to the housing 30 is through a conduit 62. When the refrigerant flows in the direction just described, the condenser 56 and the valve 60 do not function in the ordinary manner. This is because flow is in the wrong direction for them to operate. However, the equipment is being used as a heat system; that is to say, it delivers heat to the condenser 56 because it is delivering a heated gas to the condenser. The heated gas gives up some heat, and refrigerant is then returned to the downhole system for storage of heat. Thus, a full cycle of operation requires flow from the downhole pump to the evaporator 52 where it is heated, flashed into vapor and thereafter pumped by the compressor 54 to the condenser 56. Heat is surrendered at the condenser by air flowing through the condenser. Air-moving equipment, fans, ducts and the like have been omitted. It flows through the valve 60 which is a pressure control valve.

In effect, heat is picked up (during a cold winter day, typically) and carried by the refrigerant into the well to be stored by increasing the temperature of the adjacent water. Such heat can be recovered at night when it is needed.

Figure 3:
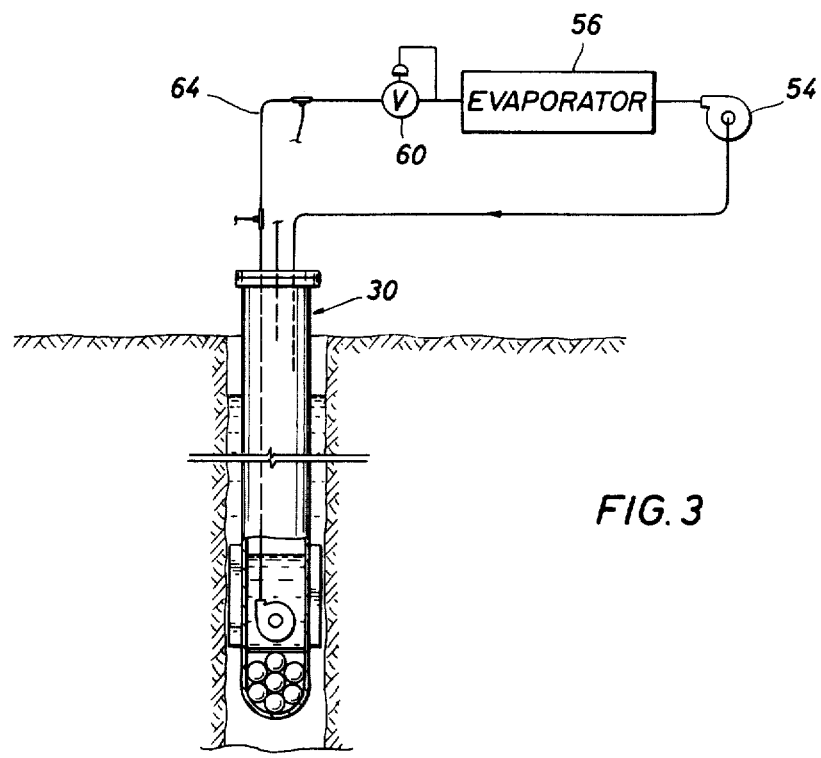
FIG. 3 is a view similar to FIG. 2 showing flow in different directions to provide a cooling cycle as contrasted with a heating cycle shown in FIG. 2.

By contrast, a cooling cycle of operation is obtained from the same equipment with the flow in the opposite direction as shown by the arrows in FIG. 3. That is to say, liquid (and cooled) refrigerant is delivered by the pump downhole through the conduit 64. It, then, flows as an input to the expansion valve 60, and conventional expansion occurs. The expanding gases are delivered to the evaporator 56. As configured in FIG. 3, the expansion valve 60 delivers expanded, chilled gas to the cooling unit 56 which functions as an evaporator. The compressor 54 is able to handle gas flow in both directions; hence, the arrows show different flow directions for the compressor 54. The gas is delivered to the housing 30 for cooling in the manner previously described.

Referring to FIGS. 2 and 3, jointly, the connected conduits are actually the same for both views, but they operate differently because the flow paths are controllably changed by valves. The downhole housing 30 functions substantially as a condenser in FIG. 3. It functions substantially as an evaporator in FIG. 2 wherein it picks up heat. Additional heat is picked up through the heat transfer coil 52 through a solar system or some other heat source. Needless to say, the solar equipment can be eliminated if there is inadequate solar radiation available for heating. The compressor 54 functions on the heating cycle in FIG. 2. Condensation, at least partially or wholly, occurs in the coil 56, and, after giving up heat at the unit 56, the cooled liquid refrigerant flows through the conduit 62 back into the housing 30.

As will be understood, the housing 30 functions in the same manner in FIGS. 2 and 3. That is to say, refrigerant gas is introduced and is cooled to liquid or heated to gas. When cooled, it is then available for use in further operation of the refrigeration equipment located at the surface.

In all instances, the pump 50 (akin to a compressor) pumps liquid, and it lifts liquid against a standing liquid head. This fact prevails unless the artesian well becomes dry, or nearly so, or some other cause disrupts the heat balance in the well-heat exchanger system. An important feature is the ability to use the system in conventional refrigeration cycle equipment and also in "heat pump" cycle equipment. The heat pump is exemplified in FIG. 2 where heat is picked up by the medium on flowing through the solar heat source 52 and back to the well water which holds the heat until night hours at which time the heat is carried by the medium from the well to the surface for heating.

The foregoing is directed to the preferred embodiment, but the scope of the present invention is determined by the claims which follow.

I claim:

1. An apparatus for use in refrigeration equipment which functions with a refrigerant which changes phase from vapor to liquid and which flows in a closed circuit through an expansion means and evaporator comprising:
   (a) a sealed housing comprising an elongate tubular member having a top end and bottom end sealed to enclose the interior thereof, said sealed housing extending into a well containing cool artesian water;
   (b) an inlet passing through said sealed housing through which a vaporous refrigerant is introduced into said sealed housing;
   (c) a plurality of deflector baffles constructed and arranged along the longitudinal axis of said elongate tubular member on the interior of said sealed housing for directing the vaporous refrigerant toward contact with the wall of said elongate tubular member of said sealed housing for condensation of the vaporous refrigerant to cool to form a liquid collecting at said bottom of said sealed housing;

(d) a pump with an inlet positioned at said bottom of said sealed housing, said pump being sufficietly placed in said sealed housing that the inlet thereof is covered by the liquid refrigerant in said sealed housing;

(e) an outlet in said sealed housing; and (f) a conduit connected at a first end to said pump and passing through said outlet in said sealed housing and connectable at a second end to said expansion means such that said pump lifts the liquid refrigerant through said conduit into said expansion means.

2. The apparatus of claim 1 including alignment means positioned on said housing for positioning and securing said housing in an artesian well bore adapted to receive and be filled with artesian water to a specified level which, at least, partly submerges said housing.

3. The apparatus of claim 1 including weight means to overcome the buoyancy of said housing wherein said housing has a sealed and closed internal chamber to thereby cause said housing to, at least, partially sink into artesian water in an artesian well.

4. An apparatus for use in heating equipment which functions with a refrigerant which changes phase from vapor to liquid and which flows in a closed circuit through a condenser comprising:

(a) a sealed housing comprising an elongate tubular member having a top end and bottom end sealed to enclose the interior thereof, said sealed housing extending into a well containing cool artesian water;

(b) an inlet passing through said sealed housing through which a vaporous refrigerant is introduced into said sealed housing;

(c) a plurality of deflector baffles constructed and arranged along the longitudinal axis of said elongate tubular member on the interior of said sealed housing for directing the vaporous refrigerant toward contact with the wall of said elongate tubular member of said sealed housing for condensation of the vaporous refrigerant to cool to form a liquid collecting at said bottom of said sealed housing;

(d) a pump with an inlet positioned toward said bottom of said sealed housing, said pump inlet being covered by the liquid refrigerant in said sealed housing;

(e) an outlet in said top of said sealed housing;

(f) a conduit connected at a first end to said pump and passing through said outlet in said sealed housing and connectable at a second end to said expansion means such that said pump lifts the liquid refrigerant through said conduit into said expansion means;

(g) a surface located, solar powered heat exchanger connected to said second end of said conduit into which liquid refrigerant flows, the liquid refrigerant thereafter being vaporized in said heat exchanger; and (h) means for transferring the vaporized refrigerant to the condenser of a conventional heating apparatus and htence to said inlet of said sealed housing.

5. For use in refrigeration equipment which functions with a refrigerant which changes phase from vapor to liquid and which flows in a closed circuit and wherein the refrigerant is expanded by an expansion means and passes through heat exchanger means to transfer heat at the heat exchanger means, the improvement for use with refrigeration equipment which comprises:

(a) a closed housing extending into water from an artesian water well wherein said housing has
  (1) an inlet for introduction of vaporous refrigerant thereinto for condensation within said housing and
  (2) further including a sump in said housing for accumulation of liquid refrigerant formed from vaporous refrigerant introduced thereinto; and (b) pump means having an intake submerged in said sump for pumping liquid refrigerant from said sump and having an outlet extending from said housing for flowing liquid refrigerant for use in refrigeration equipment.

6. The apparatus of claim 5 including heat exchanger fins on the exterior of said housing for transferring heat from the interior of said housing and the refrigerant therein to artesian water surrounding said housing.

7. The apparatus of claim 5 wherein said housing has inlet and outlet conduits, said outlet conduits being a conduit for delivery of liquified refrigerant from said pump means and wherein said inlet conduit is adapted to be connected to a source of heated and gaseous refrigerant delivered into said housing and further wherein said pump means is positioned below the surface of liquid refrigerant accumulated in said sump so that said pump means is provided with an input substantially of liquified refrigerant.

* * * * *